United States Patent [19]
Sano et al.

[11] Patent Number: 4,875,136
[45] Date of Patent: Oct. 17, 1989

[54] CERAMIC CAPACITOR AND METHOD OF MANUFACTURING THE SAME

[75] Inventors: Harunobu Sano; Yukio Sakabe, both of Kyoto; Goro Nishioka, Hyogo, all of Japan

[73] Assignee: Murata Manufacturing Co., Ltd., Japan

[21] Appl. No.: 239,188

[22] Filed: Aug. 31, 1988

[30] Foreign Application Priority Data

Sep. 3, 1987 [JP] Japan ................................ 62-221652
Oct. 6, 1987 [JP] Japan ................................ 62-253377
Oct. 6, 1987 [JP] Japan ................................ 62-253378

[51] Int. Cl.$^4$ ......................... H01G 4/10; H01G 7/00
[52] U.S. Cl. ..................................... 361/321; 29/25.42
[58] Field of Search ............... 29/25.42; 361/320, 321, 361/306, 328, 330; 264/61, 63, 65; 501/134–138

[56] References Cited

U.S. PATENT DOCUMENTS 3,133,338  5/1964  Fabricius et al. .................. 29/25.42
3,350,760 11/1967  Kilby .............................. 29/25.42 X
4,027,209  5/1977  Maher ........................... 361/321 C X
4,397,886  8/1983  Neirman et al. .................. 357/10 X
4,642,732  2/1987  Ikeda et al. ..................... 29/25.42 X

FOREIGN PATENT DOCUMENTS 62-31108  2/1987  Japan .

Primary Examiner—Donald A. Griffin
Attorney, Agent, or Firm—Ostrolenk, Faber, Gerb & Soffen

[57] ABSTRACT

A ceramic capacitor obtained by preparing a ceramic compact containing a ceramic composition which is not semiconductive upon firing in a reducing atmosphere, applying first paste containing a reducing agent or dopant to the surface of the ceramic compact, applying second paste containing a base metal on the first paste and firing the ceramic compact with the first paste and the second paste in a reducing atmosphere. A ceramic body included in the ceramic capacitor is provided with a semiconductive layer by thermal diffusion of the dopant contained in the first paste. In a portion of the capacitor enclosed between a pair of capacitance extracting electrodes defined by the second paste, the thickness of a dielectric layer is reduced by that of the semiconductive layer.

15 Claims, 4 Drawing Sheets

CERAMIC CAPACITOR AND METHOD OF MANUFACTURING THE SAME

BACKGROUND OF THE INVENTION

1. Field of the Invention

The present invention relates to a ceramic capacitor and a method of manufacturing the same.

2. Description of the Prior Art

In a conventional method of manufacturing a ceramic capacitor, a ceramic material having a high dielectric constant is shaped into a plate and sintered, and is provided with electrodes on both major surfaces. In such a ceramic capacitor, the thickness of the ceramic sintered body is reduced to a minimum in order to increase its capacitance and reduce its size. In a disc-type capacitor, which is a typical single-layer ceramic capacitor, for example, the thickness of the ceramic sintered body is 100 $\mu$m at the minimum, with a rating of 50 V.

However, such a thin ceramic sintered body is low in mechanical strength. Thus, the ceramic capacitor may be broken not only at the stage of being a finished product also during the steps of manufacturing the ceramic sintered body and forming electrodes on both major surfaces of the ceramic sintered body.

In a method of manufacturing a laminated ceramic capacitor, on the other hand, a plurality of ceramic green sheets which are printed or coated with conductor metal powder paste for forming internal electrodes are stacked and laminated with each other under pressure, and then sintered to obtain a sintered body. Thereafter external electrodes are provided on such sintered body.

In such a laminated ceramic capacitor, the capacitance per unit volume is determined by the dielectric constant of the ceramic material, the total area of the internal electrodes and the thickness of each dielectric layer. In order to obtain a small capacitor having large capacitance, therefore, it is necessary to employ a ceramic material having a high dielectric constant and reduce the thickness of the dielectric layer provided between each adjacent pair of internal electrodes. Thus, the thickness of each ceramic green sheet is set at about 20 $\mu$m, at the minimum.

The ceramic green sheets thinner than 20 $\mu$m are not easy to make flaw-free.

In addition such thin ceramic green sheets are easily mechanically damaged through handling. It is very difficult to handle such thin sheets automatically.

Further, the thin ceramic green sheets are easily deformed by solvent contained in the internal electrode paste.

A Japanese Patent Application entitled "Ceramic Capacitor", which was filed in the name of the Assignee and laid open to the public on Feb. 10, 1987 under Japanese Patent Laying-Open Gazette No. 31108/1987, discloses a ceramic capacitor comprising a ceramic body having an insulation layer and semiconductive layers formed on both surfaces of the insulation layer and capacitance extracting electrodes provided on the surfaces of the semiconductive layers respectively. In this ceramic capacitor, a ferroelectric ceramic body is obtained by firing barium titanate, for example, and paste containing a strong-reducing type metal is applied to both major surfaces of the ceramic body to form capacitance extracting electrodes and then baked. This ceramic capacitor can be obtained by (1) firing ferroelectric material such as barium titanate, (2) applying electrode paste containing a reducer element on both surfaces of the ceramic body, and (3) applying heat treatment to form semiconductive layers in the vicinity of the surfaces of the ceramic body, and to form capacitance extracting electrodes on the surfaces of the ceramic body.

However, the technique disclosed in the aforementioned Gazette is not applicable to a laminated ceramic capacitor. In order to manufacture a laminated ceramic capacitor, the ceramic body must already contain paste for forming internal electrodes when the same is fired. And such paste must contain noble metals, such as gold, platinum, palladium, which can withstand an oxidizing atmosphere, since a ceramic material is generally fired in an oxidizing atmosphere. However, among such noble metals, none reduces ceramic dielectrics in the atmosphere.

U.S. Pat. No. 4,451,869 entitled "Laminated Ceramic Capacitor", which was issued on May 29, 1984 and granted to Sakabe et al., disclosed a laminated ceramic capacitor comprising a dielectric member of a non-reducing ceramic material, which can be fired in a reducing atmosphere. However, the capacitance obtained in such a capacitor employing a non-reducing ceramic material is lower than that of a capacitor which is fired in the aforementioned oxidizing atmosphere, i.e., a capacitor employing a reducing ceramic material.

SUMMARY OF THE INVENTION

Accordingly, an object of the present invention is to provide a ceramic capacitor having large capacitance and high mechanical strength and a method of manufacturing the same.

Another object of the present invention is to provide a method of efficiently manufacturing a capacitor which can attain the aforementioned object.

A ceramic capacitor according to the present invention first comprises a ceramic body which is obtained by firing, in a reducing atmosphere, a ceramic composition which is not made semiconductive upon firing in a reducing atmosphere. At least a pair of capacitance extracting electrodes are formed to be opposite to each other while enclosing at least a part of the ceramic body. These electrodes contain a base metal as a conductive material. The part of the ceramic body held between the pair of electrodes includes a dielectric layer and a semiconductive layer which is in contact with both of; at least one surface of the dielectric layer and at least one of the pair of electrodes. This semiconductive layer is defined by diffusion of a reducing agent or dopant at the firing stage for obtaining the ceramic body.

According to the present invention, a single-layer capacitor is provided when the ceramic body is in the form of a plate having first and second major surfaces which are opposite to each other and the capacitance extracting electrodes are formed on the first and second major surfaces respectively. On the other hand, a laminated capacitor is provided when the capacitance extracting electrodes are formed in layers within the ceramic body.

In the method of manufacturing a ceramic capacitor according to the present invention, prepared are; an unfired ceramic compact containing a ceramic composition which is not made semiconductive upon firing in a reducing atmosphere, and, a first paste containing a reducing agent or dopant and varnish. The first paste is applied to the ceramic compact, which in turn is fired in a reducing atmosphere thereby to obtain a ceramic body. The ceramic body is provided with a semiconductive layer which is made semiconductive by the dopant contained in the paste. The manufacturing method according to the present invention further comprises a step of forming at least a pair of capacitance extracting electrodes. These electrodes may be opposite to each other while enclosing at least a part of the ceramic body. At least one of the electrodes is in contact with the semiconductive layer.

The first paste may or may not contain base metal powder having a melting point which is higher than a firing temperature which is applied in the step of obtaining the ceramic body. The first paste containing the base metal powder may define the capacitance extracting electrodes upon completion of the step of firing the ceramic compact. If the first paste contains no base metal powder, a second paste is separately prepared which contains base metal powder and varnish. The first paste is overlapped with the second paste, as applied to the surface of the ceramic compact. The capacitance extracting electrodes may be formed from a metal paste baking method or a metal thin film forming method, for example, after the ceramic body is obtained.

According to the present invention, at least a part of the ceramic body held between the pair of capacitance extracting electrodes defines a semiconductive layer in a region which is in contact with at least one of the electrodes. Therefore, the thickness of the dielectric layer defined by the ceramic body between the pair of electrodes is reduced by the thickness of the semiconductive layer. Thus, even if the thickness of the ceramic body part held between the pair of electrodes is increased or is large the dielectric layer, contributing to formation of capacitance, can be thin. Thus, a ceramic capacitor is obtained which can satisfy the requirements both of high mechanical strength and large capacitance.

Further, ceramic green sheets do not have to be reduced in thickness, in order to obtain a laminated ceramic capacitor according to the present invention. Thus, the ceramic green sheets can be easily handled in the steps of manufacturing the ceramic capacitor, whereby steps of printing internal electrodes and drying the ceramic green sheets can be easily automated.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a sectional view showing a ceramic compact 1a employed in a second embodiment of the present invention, which is provided with a first paste film 4a on one major surface 2a;

FIG. 12 is a sectional view showing a ceramic compact 17a employed in a sixth embodiment of the present invention, which is provided with a paste film 20a containing a reducing agent or dopant and a base metal on one major surface 18a and with a paste film 31 containing a base metal on another major surface 19a;

DESCRIPTION OF THE PREFERRED EMBODIMENTS

A first embodiment of the present invention is now described with reference to FIGS. 1 to 4.

Figure 1:
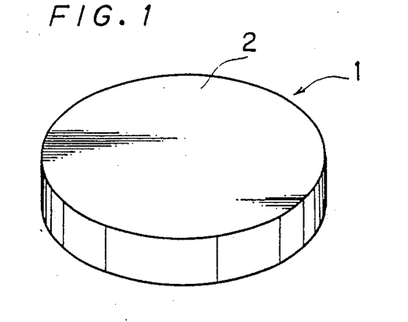
FIG. 1 is a perspective view showing a ceramic compact 1 employed in a first embodiment of the present invention.

As shown in FIG. 1, first prepared is a ceramic compact 1 in the form of a disc, for example. This ceramic compact 1 contains a ceramic composition which is not made semiconductive even if the same is fired in a reducing atmosphere. Examples of such non-reducing ceramic composition are disclosed in the aforementioned U.S Pat. No. 4,451,869.

The following compositions are illustrated as such non-reducing dielectric ceramic compositions;

(1) Non-reducing dielectric ceramic compositions in barium titanate dielectric ceramic compositions shown by the following composition formula:

$$\{(Ba_{1-x}Ca_x)O\}_m \cdot (Ti_{1-y}Zr_y)O_2,$$

wherein m, x and y are limited in the following ranges;

$1.005 \leq m \leq 1.03$, $0.02 \leq x \leq 0.22$, and $0 < y 0.20$.

(2) Non-reducing dielectric ceramic compositions in barium titanate dielectric ceramic compositions shown by the following composition formula:

$$\{(Ba_{1-x-y}Ca_xSr_y)O\}_m \cdot TiO_2,$$

wherein m, x and y are in the following ranges, respectively;

$1.005 \leq m \leq 1.03$, $0.02 \leq x \leq 0.22$, and $0.05 \leq y \leq 0.35$.

(3) Non-reducing dielectric ceramic compositions in barium titanate dielectric ceramic compositions shown by the following composition formula:

$$\{(Ba_{1-x-y}Ca_xSr_y)O\}_m \cdot (Ti_{1-z}Zr_z)O_2,$$

wherein m, x, y and z are the following ranges, respectively;

$1.005 \leq m \leq 1.03$, $0.02 \leq x \leq 0.22$, $0.05 \leq y \leq 0.35$, and $0.00 < z \leq 0.20$.

(4) Non-reducing dielectric ceramic compositions comprising $CaZrO_3$ and $MnO_2$ and having the following general formula:

$$Ca_xZrO_3 + yMnO_2,$$

wherein x of $Ca_xZrO_3$ ranges as follows and $MnO_2$ (=y) takes the following proportion by weight when the weight of $Ca_xZrO_3$ is taken as 1.00.

$0.85 \leq x \leq 1.30$ $0.05 \leq y \leq 0.08$ (proportion of weight)

(5) Non-reducing dielectric ceramic compositions comprising $(BaCa)ZrO_3$ and $MnO_2$ and having the following general formula:

$$(Ba_x; Ca_{1-x})_y ZrO_3 + zMnO_2,$$

wherein x and y of $(Ba_xCa_{1-x})_yZrO_3$ are in the following ranges and $MnO_2$ (=x) takes the following proportion by weight when the weight of $(Ba_xCa_{1-x})_yZrO_3$ is taken as 1.00.

$0 < x \leq 0.20$ $0.85 \leq y \leq 1.30$ $0.005 \leq z \leq 0.08$ (proportion by weight)

Firing these non-reducing dielectric ceramic compositions (1) to (5) even in a neutral or reducing atmosphere does not cause the decrease of insulation resistance or the increase of dielectric loss of the ceramics.

The aforementioned non-reducing ceramic compositions are also applicable to other embodiments of the present invention as hereinafter described.

Figure 2:
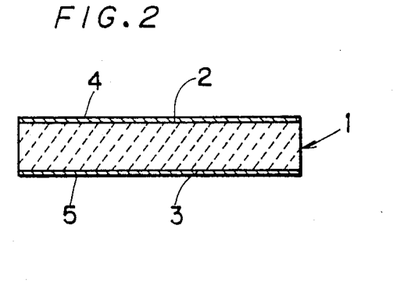
FIG. 2 is a sectional view showing first paste films 4 and 5 formed on both major surfaces 2 and 3 of the ceramic compact 1 shown in FIG. 1.

Then, first paste films 4 and 5 are respectively provided on both major surfaces 2 and 3 of the ceramic compact 1, as shown in FIG. 2. The first paste films 4 and 5 are formed of first paste containing a reducing agent or dopant and varnish. The dopant consists of an element which is selected from the group consisting of niobium, lanthanum, cerium and rare earth elements, an oxide selected from the group consisting of those containing the aforementioned elements such as $Nb_2O_5$, $Y_2O_3$, $CeO_2$, $La_2O_3$, $Nd_2O_3$, $Sm_2O_3$, $Pr_6O_{11}$ and $Dy_2O_3$, or other compounds.

Such dopants are also applicable to other embodiments as hereinafter described.

Figure 3:
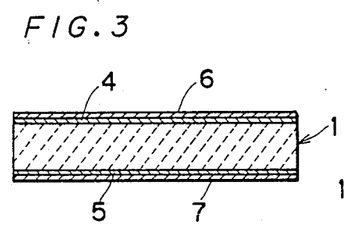
FIG. 3 is a sectional view showing second paste films 6 and 7 respectively formed on the first paste films 4 and 5 shown in FIG. 2.

Then, second paste films 6 and 7 are further provided on respective surfaces of the first paste films 4 and 5, as shown in FIG. 3. The second paste films 6 and 7 are formed of second paste containing base metal powder and a vehicle. The base metal is selected from those having melting points higher than a temperature for firing the aforementioned ceramic compact 1, such as nickel, iron, cobalt, chromium, copper and aluminum.

Such base metals are also applicable to other embodiments as hereinafter described.

Figure 4:
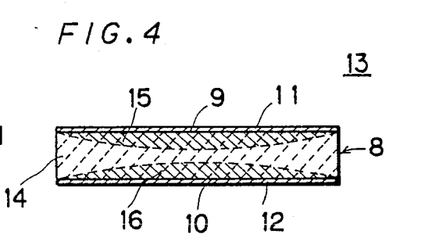
FIG. 4 is a sectional view showing a ceramic capacitor 13 obtained by the first embodiment of the present invention.

Then the structure shown in FIG. 3 is fired in a reducing atmosphere. This reducing atmosphere is composed of nitrogen, hydrogen, argon, carbon dioxide, carbon monoxide or mixture thereof. FIG. 4 shows a ceramic capacitor 13 obtained by firing in the reducing atmosphere.

Referring to FIG. 4, the ceramic capacitor 13 comprises a ceramic body 8, which is provided with capacitance extracting electrodes 11 and 12 on both major surfaces 9 and 10. In this ceramic capacitor 13, the ceramic body 8 is obtained by firing the aforementioned ceramic compact 1. In such firing, the electrodes 11 and 12 are obtained from the second paste films 6 and 7 respectively. The ceramic body 8 comprises a dielectric layer 14 and semiconductive layers 15 and 16 enclosing the dielectric layer 14 therebetween. The electrodes 11 and 12 are in contact with the semiconductive layers 15 and 16 respectively. In the firing stage for obtaining the ceramic body 8, the dopant contained in the first paste films 4 and 5 is thermally diffused in the vicinity of the major surfaces 9 and 10 of the ceramic body 8, thereby to define the semiconductive layers 15 and 16. Upon such formation of the semiconductive layers 15 and 16, the dielectric layer 14 is reduced in thickness by the thicknesses the semiconductive layers 15 and 16, with respect to the ceramic body 8. Thus, capacitance extracted by the electrodes 11 and 12 can be increased although the entire thickness of the ceramic capacitor 13 is large and it has high mechanical strength.

The electrodes 11 and 12 obtained from the second paste films 6 and 7 can be increased in adhesion to the ceramic body 8 by addition of a substantially non-reducible glass frit of barium borosilicate or calcium boroaluminate to the second paste films 6 and 7.

Figure 5:
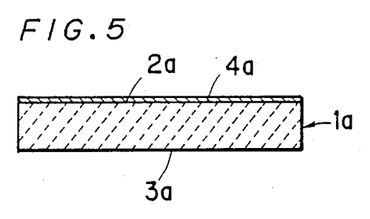
Figure 6:
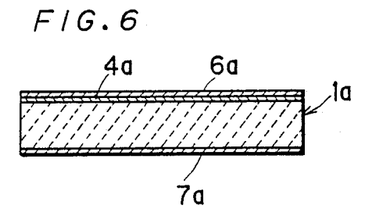
FIG. 6 is a sectional view showing second paste films 6a and 7a formed on the first paste film 4a and another major surface 3a of the ceramic compact 1a shown in FIG. 5 respectively.
Figure 7:
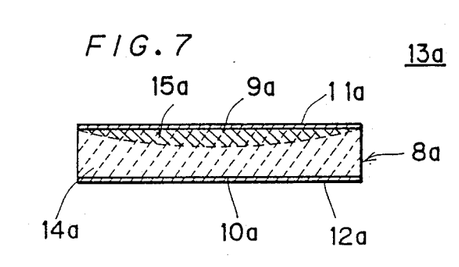
FIG. 7 is a sectional view showing a ceramic capacitor 13a obtained by the second embodiment of the present invention.

FIGS. 5 to 7 show a second embodiment of the present invention.

Referring to FIG. 5, a first paste film 4a of first paste is provided only on one major surface 2a of a ceramic compact 1a.

Then, second paste films 6a and 7a of second paste are respectively provided on the first paste film 4a and another major surface 3a of the ceramic compact 1a, as shown in FIG. 6.

FIG. 7 shows a ceramic capacitor 13a, which is obtained upon firing of the structure shown in FIG. 6. The ceramic capacitor 13 comprises a ceramic body 8a which is provided with capacitance extracting electrodes 11a and 12a on its major surfaces 9a and 10a.

According to this embodiment, only one semiconductive layer 15a is formed to be in contact with the electrode 11a, as shown in FIG. 7. On the other hand, a dielectric layer 14a is in contact with the other electrode 12a.

Experiment 1, which was carried out on the basis of the first and second embodiments will now be described.

Experiment 1

First, non-reducing dielectric ceramic compositions were prepared from those shown by a general formula $\{(Ba_{1-x}Ca_x)O\}_m(Ti_{1-y}Zr_y)O_2$, where $1.005 \leq m \leq 1.03$, $0.02 \leq x \leq 0.22$ and $0 < y \leq 0.20$. Raw material were weighted in the amounts shown in Table 1 to obtain the ceramic composition and mixed together. The resulting mixture were calcined and pulverized into powder. 5 parts by weight of a binder of vinyl acetate resin was added to each powder raw material, which was then subjected to wet mixing for 16 hours by utilizing an agate ball. The wet-mixed material was evaporated/dried and then granulated into a pellet. This pellet was molded by a dry press under a pressure of 2.5 ton/cm$^2$, to obtain a compact of 12 mm in diameter and 1 to 0.3 mm in thickness.

First paste members were prepared by mixing vehicle consisting of ethyl cellulose resin and a butyl cellosolve solvent with dopants at the ratios shown in Table 1. The dopants were selected from oxide powder materials such as $Nb_2O_5$, $Y_2O_3$, $CeO_2$, $La_2O_3$, $Nd_2O_3$, $Sm_2O_3$, $Pr_6O_{11}$, $Eu_2O_3$, $Gd_2O_3$, $Tb_2O_3$, $Dy_2O_3$, $Ho_2O_3$, $Er_2O_3$, $Tm_2O_3$ and $Yb_2O_3$. Second powder was prepared from Ni powder and varnish.

TABLE 1

| Sample No. | First Paste Vehicle (wt. %) | Dopant Type | Dopant Content (wt. %) | Application | Ceramic Composition $\{(Ba_{1-x}Ca_x)O\}_m(Ti_{1-y}Zr_y)O_2$ m | 1−x | x | 1−y | y |
|---|---|---|---|---|---|---|---|---|---|
| 1* | — | — | — | — | 1.01 | 0.90 | 0.10 | 0.80 | 0.20 |
| 2 | 80 | $Nb_2O_5$ | 20 | Single | 1.01 | 0.90 | 0.10 | 0.80 | 0.20 |
| 3 | 90 | $CeO_2$ | 10 | Double | 1.01 | 0.90 | 0.10 | 0.80 | 0.20 |
| 4 | 60 | $CeO_2$ | 40 | Single | 1.01 | 0.90 | 0.10 | 0.80 | 0.20 |
| 5 | 80 | $La_2O_3$ | 20 | Double | 1.01 | 0.90 | 0.10 | 0.80 | 0.20 |
| 6 | 90 | $Nd_2O_3$ | 10 | Double | 1.01 | 0.90 | 0.10 | 0.80 | 0.20 |
| 7 | 70 | $Pr_6O_{11}$ | 30 | Single | 1.01 | 0.90 | 0.10 | 0.80 | 0.20 |
| 8* | — | — | — | — | 1.01 | 0.80 | 0.20 | 0.90 | 0.10 |
| 9 | 85 | $Sm_2O_3$ | 15 | Double | 1.01 | 0.80 | 0.20 | 0.90 | 0.10 |
| 10 | 70 | $Eu_2O_3$ | 30 | Single | 1.01 | 0.80 | 0.20 | 0.90 | 0.10 |
| 11 | 50 | $Gd_2O_3$ | 50 | Single | 1.01 | 0.80 | 0.20 | 0.90 | 0.10 |
| 12 | 90 | $Y_2O_3$ | 10 | Double | 1.01 | 0.80 | 0.20 | 0.90 | 0.10 |
| 13 | 90 | $La_2O_3$ | 10 | Single | 1.01 | 0.80 | 0.20 | 0.90 | 0.10 |
| 14 | 95 | $CeO_2$ | 5 | Double | 1.01 | 0.80 | 0.20 | 0.90 | 0.10 |
| 15* | — | — | — | — | 1.01 | 0.90 | 0.10 | 0.85 | 0.15 |
| 16 | 90 | $Dy_2O_3$ | 10 | Double | 1.01 | 0.90 | 0.10 | 0.85 | 0.15 |
| 17 | 60 | $Er_2O_3$ | 40 | Single | 1.01 | 0.90 | 0.10 | 0.85 | 0.15 |
| 18 | 85 | $Tm_2O_3$ | 15 | Double | 1.01 | 0.90 | 0.10 | 0.85 | 0.15 |
| 19 | 85 | $Yb_2O_3$ | 15 | Double | 1.01 | 0.90 | 0.10 | 0.85 | 0.15 |
| 20 | 85 | $Tb_2O_3$ | 15 | Single | 1.01 | 0.90 | 0.10 | 0.85 | 0.15 |
| 21 | 90 | $Ho_2O_3$ | 10 | Double | 1.01 | 0.90 | 0.10 | 0.85 | 0.15 |

*reference sample

The first paste was applied by screen printing to a single side ("Single") or both sides ("Double") of each compact, which was then dried at 150° C. for two hours. Then, the second paste was applied by screen printing to both sides of the compact, which was dried at 150° C. for two hours.

The compact thus coated with the first paste and the second paste was fired in a reducing atmosphere of $H_2$ gas and $N_2$ gas having oxygen partial pressure of $10^{-9}$ to $10^{-12}$ MPa at 1300° C. to obtain a sample (capacitor).

Table 2 shows values of capacitance, dielectric loss, dielectric constant and specific resistance of such samples.

The capacitance was measured in an atmosphere of 25° C. and the dielectric loss was measured at 1 kHz and 1 $V_{rms}$, while the dielectric constant was calculated from the capacitance and the dimension of each sample and the specific resistance was measured after applying DC voltage of 500 V for two minutes at 25° C.

TABLE 2

| Sample No. | Molding Thickness (mm) | Electrical Property | | | |
|---|---|---|---|---|---|
| | | Capacitance (nF) | Dielectric Loss (%) | Dielectric constant | Specific Resistance ($\Omega$ cm) |
| 1* | 1.0 | 6.49 | 2.3 | 7900 | $9.0 \times 10^{12}$ |
| 2 | 0.5 | 29.72 | 2.8 | 18100 | $2.1 \times 10^{12}$ |
| 3 | 0.4 | 35.30 | 2.0 | 17200 | $8.7 \times 10^{12}$ |
| 4 | 0.7 | 22.87 | 2.1 | 19500 | $7.9 \times 10^{12}$ |
| 5 | 0.5 | 33.17 | 1.9 | 20200 | $7.6 \times 10^{12}$ |
| 6 | 0.7 | 19.59 | 1.9 | 16700 | $5.4 \times 10^{12}$ |
| 7 | 0.7 | 21.11 | 2.3 | 18000 | $6.1 \times 10^{12}$ |
| 8* | 1.0 | 5.54 | 2.0 | 6700 | $2.2 \times 10^{13}$ |
| 9 | 0.5 | 24.46 | 1.9 | 14900 | $9.3 \times 10^{12}$ |
| 10 | 0.4 | 30.99 | 2.1 | 15100 | $6.9 \times 10^{12}$ |
| 11 | 1.0 | 12.80 | 2.3 | 15600 | $8.1 \times 10^{12}$ |
| 12 | 0.8 | 14.88 | 1.7 | 14500 | $2.0 \times 10^{13}$ |
| 13 | 0.3 | 37.76 | 1.8 | 13800 | $1.0 \times 10^{13}$ |
| 14 | 0.3 | 38.31 | 1.8 | 14000 | $1.1 \times 10^{13}$ |
| 15* | 1.0 | 7.80 | 1.3 | 9500 | $7.7 \times 10^{12}$ |
| 16 | 0.5 | 42.03 | 1.0 | 25600 | $7.4 \times 10^{12}$ |
| 17 | 0.8 | 21.65 | 1.2 | 21100 | $6.3 \times 10^{12}$ |
| 18 | 0.4 | 42.49 | 0.9 | 20700 | $6.9 \times 10^{12}$ |
| 19 | 0.4 | 42.08 | 1.0 | 20500 | $6.8 \times 10^{12}$ |
| 20 | 0.3 | 54.46 | 0.8 | 19900 | $7.3 \times 10^{12}$ |
| 21 | 0.8 | 22.88 | 0.9 | 22300 | $7.0 \times 10^{12}$ |

*reference sample

The ceramic capacitors of Sample Nos. 2 to 7, 9 to 14 and 16 to 21 shown in Table 2 were provided with semiconductive layers. Therefore, the dielectric constants of these samples were at least twice those of the ceramic capacitors of Sample Nos. 1, 8 and 15, which were provided with no first paste layers or no semiconductive layers, and the values of specific resistance thereof exceeded $10^{12}$ $\Omega$cm.

In the aforementioned method of manufacturing a ceramic capacitor according to the first or second embodiment of the present invention, the dielectric layer 14 or 14a, the semiconductive layer 15 or 15a (and the semiconductive layer 16) and the electrodes 11 or 11a and 12 or 12a can be efficiently simultaneously formed in a single firing step. The electrodes 11 or 11a and 12 or 12a are formed of a base metal or an alloy thereof, whereby the ceramic capacitor can be obtained at a low cost.

A third embodiment of the present invention is now described with reference to FIG. 8.

According to the third embodiment, a firing step in a reducing atmosphere is carried out in the aforementioned stage shown in FIG. 2. FIG. 8 shows a ceramic body 8 thus obtained. The ceramic body 8 shown in FIG. 8 is substantially identical in structure to the ceramic body 8 included in the ceramic capacitor 13 shown in FIG. 4. Thus, corresponding parts are indicated by the same reference numerals, to omit redundant description.

Figure 8:
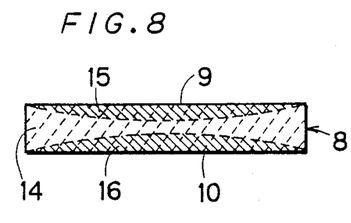
FIG. 8 is a sectional view showing a ceramic body 8 obtained by carrying out a manufacturing method according to a third embodiment of the present invention.

The ceramic body 8 shown in FIG. 8 is provided on its major surfaces 9 and 10 with paste films (not shown) which are similar in composition to the aforementioned second paste films 6 and 7. These paste films define the capacitance extracting electrodes 11 and 12 shown in FIG. 4 through heat treatment, i.e., baking. In the third embodiment, the electrodes 11 and 12 can be formed by a thin film forming method such as plating or evaporation, for example.

Figure 9:
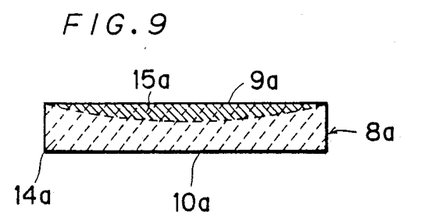
FIG. 9 is a sectional view showing a ceramic body 8a obtained by carrying out a manufacturing method according to a fourth embodiment of the present invention.

FIG. 9 shows a fourth embodiment of the present invention.

A ceramic body 8a shown in FIG. 9 is substantially identical in structure to the ceramic body 8a included in the ceramic capacitor 13a shown in FIG. 7. Thus, corresponding parts are indicated by the same reference numerals, to omit redundant description.

The ceramic body 8a shown in FIG. 9 can be obtained by carrying out a firing step in the aforementioned stage shown in FIG. 5. Then the capacitance extracting electrodes 11a and 12a (FIG. 7) are formed on both major surfaces 9a and 10a of the ceramic body 8a by a method similar to that of the third embodiment.

Experiment 2, which was carried out on the basis of the third and fourth embodiments will now be described.

Experiment 2

Compacts were obtained by the same method as that of Experiment 1.

The first paste was applied by screen printing to both sides ("Double") or a single side ("Single") of each compact, which was then dried at 150° C. for two hours.

The compact thus coated with the first paste was fired in a reducing atmosphere of $H_2$ gas and $N_2$ gas having oxygen partial pressure of $10^{-9}$ to $10^{-12}$ MPa at 1300° C.

Some of dielectric ceramics thus obtained were coated with paste of Al powder and vehicle on both major surfaces and fired in a neutral atmosphere at 750° C., to be provided with electrodes.

Remaining dielectric ceramics were subjected to electroless plating, to be provided with Ni electrodes on both major surfaces.

Table 4 shows values of capacitance, dielectric loss, dielectric constant and specific resistance of these samples.

Sample Nos. 22, 23 and 24 were provided with Al electrodes and Sample Nos. 25 and 26 were provided with Ni electrodes.

The capacitance was measured at 25° C. and the dielectric loss was measured at 1 kHz and 1 $V_{rms}$, while the dielectric constant was calculated from the capacitance and the dimension of each sample and the specific resistance was measured after applying DC voltage of 500 V at 25° C.

TABLE 3

| Sample No. | First Paste | | | | Ceramic Composition | | | |
|---|---|---|---|---|---|---|---|---|
| | Vehicle (wt. %) | Dopant | | Application | $\{(Ba_{1-x}Ca_x)O\}_m(Ti_{1-y}Zr_y)O_2$ | | | |
| | | Type | Content (wt. %) | | m | 1−x | x | 1−y | y |
| 22* | — | — | — | — | 1.01 | 0.80 | 0.20 | 0.90 | 0.10 |
| 23 | 90 | $CeO_2$ | 10 | Double | 1.01 | 0.80 | 0.20 | 0.90 | 0.10 |
| 24 | 80 | $La_2O_3$ | 20 | Single | 1.01 | 0.80 | 0.20 | 0.90 | 0.10 |
| 25* | — | — | — | — | 1.01 | 0.80 | 0.20 | 0.90 | 0.10 |
| 26 | 90 | $Sm_2O_3$ | 10 | Double | 1.01 | 0.80 | 0.20 | 0.90 | 0.10 |

*reference sample

TABLE 4

| Sample No. | Molding Thickness (mm) | Electrode | Electrical Property | | | |
|---|---|---|---|---|---|---|
| | | | Capacitance (nF) | Dielectric Loss (%) | Dielectric Constant | Specific Resistance ($\Omega$ cm) |
| 22* | 1.0 | Al Metal Baking | 5.70 | 2.3 | 6900 | $1.3 \times 10^{13}$ |
| 23 | 0.5 | Al Metal Baking | 24.79 | 2.1 | 15100 | $1.0 \times 10^{13}$ |
| 24 | 0.4 | Al Metal Baking | 28.73 | 2.0 | 14000 | $1.0 \times 10^{13}$ |
| 25* | 1.0 | Ni Electroless Plating | 5.55 | 2.1 | 6700 | $2.0 \times 10^{13}$ |
| 26 | 0.8 | Ni Electroless Plating | 14.67 | 2.1 | 14300 | $8.9 \times 10^{12}$ |

*reference sample

As obvious from Table 4, the ceramic capacitors of Sample Nos. 23, 24 and 26 were provided with semiconductive layers. Therefore, the dielectric constants of these samples were at least twice those of the ceramic capacitors of Sample Nos. 22 and 25, which were provided with no first paste layers or no semiconductive layers, and the values of specific resistance thereof exceeded $10^{12}$ $\Omega$cm.

A fifth embodiment of the present invention is now described with reference to FIGS. 10 and 11.

Figure 10:
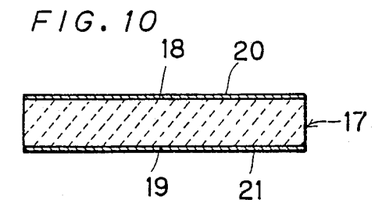
FIG. 10 is a sectional view showing a ceramic compact 17 employed in a fifth embodiment of the present invention, which is provided with paste films 20 and 21 on both major surfaces 18 and 19 and containing a reducing agent or dopant and a base metal, respectively.

Referring to FIG. 10, a ceramic compact 17 containing a non-reducing ceramic composition is prepared. Paste films 20 and 21 are provided on both major surfaces 18 and 19 of the ceramic compact 17 respectively. These paste films 20 and 21 are formed of paste containing base metal powder having a melting point higher than a temperature for firing the ceramic composition of ceramic compact 17, reducing agent or dopant powder and a vehicle.

Figure 11:
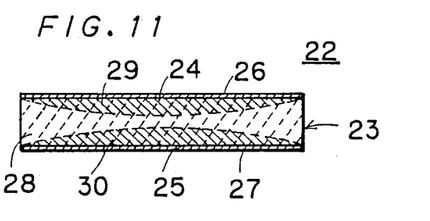
FIG. 11 is a sectional view showing a ceramic capacitor 22 obtained by the fifth embodiment of the present invention.

FIG. 11 shows a ceramic capacitor 22, which is obtained by firing the structure shown in FIG. 10 in a reducing atmosphere.

The ceramic capacitor 22 comprises a ceramic body 23, which is provided with capacitance extracting electrodes 26 and 27 on both major surfaces 24 and 25 respectively. The ceramic body 23 is obtained from the aforementioned ceramic compact 17 and the electrodes 26 and 27 are obtained from the paste films 20 and 21. The ceramic body 23 comprises a dielectric layer 28 and semiconductive layers 29 and 30 holding the dielectric layer 28 therebetween. The dopant contained in the paste films 20 and 21 is thermally diffused in the vicinity of the major surfaces 24 and 25 of the ceramic body 23 in a firing stage, whereby the semiconductive layers 29 and 30 are obtained.

A sixth embodiment of the present invention is now described with reference to FIGS. 12 and 13.

Figure 12:
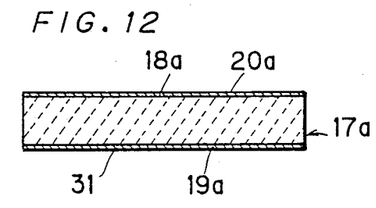

Referring to FIG. 12, a ceramic compact 17a is prepared similarly to the ceramic compact 17 shown in FIG. 10. A paste film 20a is provided on one major surface 18a of the ceramic compact 17a. This paste film 20a contains base metal powder and reducing agent or dopant powder, similarly to the paste films 20 and 21 shown in FIG. 10. On the other hand, another paste film 31 is provided on the other major surface 19a of the ceramic compact 17a. The paste film 31 contains base metal powder and vehicle, but no dopant.

Figure 13:
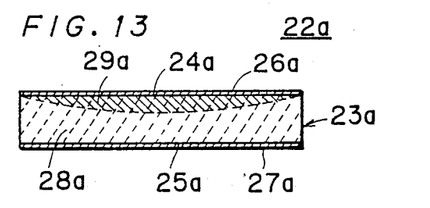
FIG. 13 is a sectional view showing a ceramic capacitor 22a obtained by the sixth embodiment of the present invention.

FIG. 13 shows a ceramic capacitor 22a which is obtained by firing the structure shown in FIG. 12 in a reducing atmosphere. The ceramic capacitor 22a comprises a ceramic body 23a which is provided with capacitance extracting electrodes 26a and 27a on both major surfaces 24a and 25a. The ceramic body 23a is obtained from the ceramic compact 17a. The electrodes 26a and 27a are obtained from the paste films 20a and 31 respectively. The ceramic body 23a is provided with a semiconductive layer 29a only in the vicinity of one major surface 24a. The remaining portion of the ceramic body 23a defines a dielectric layer 28a, since the dopant is contained only in the paste film 20a.

Experiment 3, which was carried out on the basis of the aforementioned fifth and sixth embodiments will now be described.

Experiment 3

Compacts were obtained by a method similar to that of Experiment 1, in compositions shown in Table 5.

Ni metal powder materials were mixed with dopant powder members of $Nb_2O_5$, $Y_2O_3$, $CeO_2$, $La_2O_3$, $Nd_2O_3$, $Sm_2O_3$, $Pr_6O_{11}$ and $Dy_2O_3$ in the mixing ratios shown in Table 5. Each mixture was kneaded with 3 parts by weight of ethyl cellulose resin and a butyl cellosolve solvent, to obtain paste.

Each paste was applied by screen printing to both sides ("Double") or a single side ("Single") (the other side was coated with Ni powder paste containing no dopant) of each ceramic compact, which was then dried at 150° C. for two hours. Thereafter the compact was fired in a reducing atmosphere of $H_2$ gas an $N_2$ gas having oxygen partial pressure of $10^{-9}$ to $10^{-12}$ MPa, to obtain a sample of a ceramic capacitor, which was subjected to measurement.

Table 6 shows the values of capacitance at 25° C., dielectric loss (tan$\delta$) at 1 kHz and 1 $V_{rms}$ and dielectric constant calculated from the capacitance and the configuration of each sample.

TABLE 5

| Sample No. | Ni Content (wt. %) | Dopant | | Application | Ceramic Composition $\{(Ba_{1-x}Ca_x)O\}_m(Ti_{1-y}Zr_y)O_2$ | | | | |
|---|---|---|---|---|---|---|---|---|---|
| | | Type | Content (wt. %) | | m | 1 − x | x | 1 − y | y |
| 27* | 100 | — | 0 | Double | 1.01 | 0.90 | 0.10 | 0.80 | 0.20 |
| 28 | 80 | $Nb_2O_5$ | 20 | Double | " | " | " | " | " |
| 29 | 70 | $Nb_2O_5$ | 30 | Single | " | " | " | " | " |
| 30 | 75 | $CeO_2$ | 25 | Double | " | " | " | " | " |
| 31 | 60 | $Y_2O_3$ | 40 | Single | " | " | " | " | " |

TABLE 5-continued

| Sample No. | Ni Content (wt. %) | Dopant Type | Dopant Content (wt. %) | Application | Ceramic Composition $\{(Ba_{1-x}Ca_x)O\}_m(Ti_{1-y}Zr_y)O_2$ m | 1 − x | x | 1 − y | y |
| --- | --- | --- | --- | --- | --- | --- | --- | --- | --- |
| 32 | 65 | $La_2O_3$ | 35 | Single | " | " | " | " | " |
| 33 | 40 | $Nb_2O_3$ | 60 | Double | " | " | " | " | " |
| 34* | 100 | — | 0 | Double | 1.01 | 0.80 | 0.20 | 0.90 | 0.10 |
| 35 | 95 | $Nb_2O_3$ | 5 | Double | " | " | " | " | " |
| 36 | 50 | $CeO_2$ | 50 | Double | " | " | " | " | " |
| 37 | 70 | $Nd_2O_3$ | 30 | Single | " | " | " | " | " |
| 38 | 80 | $Sm_2O_3$ | 20 | Double | " | " | " | " | " |
| 39* | 100 | — | 0 | Double | 1.01 | 0.90 | 0.10 | 0.85 | 015 |
| 40 | 40 | $CeO_2$ | 60 | Single | " | " | " | " | " |
| 41 | 90 | $Pr_6O_{11}$ | 10 | Double | " | " | " | " | " |
| 42 | 90 | $Dy_2O_3$ | 10 | Double | " | " | " | " | " |
| 43 | 85 | $Nb_2O_5$ | 15 | Double | " | " | " | " | " |

*reference sample

TABLE 6

| Sample No. | Molding Thickness (mm) | Capacitance (nF) | Dielectric Loss (%) | Apparent Dielectric Constant |
| --- | --- | --- | --- | --- |
| 27* | 1.0 | 6.49 | 2.3 | 7900 |
| 28 | 0.8 | 23.85 | 2.7 | 23200 |
| 29 | 0.5 | 31.47 | 2.6 | 19200 |
| 30 | 0.8 | 16.43 | 2.0 | 16000 |
| 31 | 0.3 | 55.41 | 1.7 | 20300 |
| 32 | 0.3 | 46.66 | 1.8 | 17000 |
| 33 | 1.0 | 24.18 | 3.3 | 29500 |
| 34* | 1.0 | 5.54 | 2.0 | 6700 |
| 35 | 0.3 | 42.56 | 2.2 | 15600 |
| 36 | 1.0 | 11.24 | 1.9 | 13700 |
| 37 | 0.4 | 32.22 | 1.7 | 15700 |
| 38 | 0.4 | 35.41 | 1.7 | 17300 |
| 39* | 1.0 | 7.80 | 1.3 | 9500 |
| 40 | 0.5 | 49.17 | 0.9 | 29900 |
| 41 | 0.3 | 57.72 | 0.8 | 21100 |
| 42 | 0.3 | 53.34 | 1.0 | 19500 |
| 43 | 0.7 | 27.55 | 1.6 | 23500 |

*reference sample

As obvious from Tables 5 and 6, all of the samples according to the present invention, which were prepared with the Ni powder paste containing dopants, had apparent dielectric constants of at least twice those of the samples of Nos. 27, 34 and 39, which were prepared with the Ni powder paste containing no dopants.

A seventh embodiment of the present invention is now described with reference to FIGS. 14 to 17. This embodiment is directed to a laminated ceramic capacitor.

Figure 14:
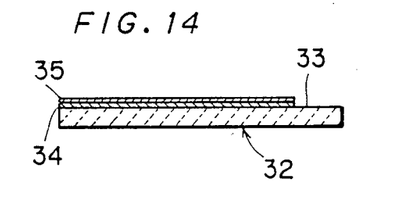
FIG. 14 is a sectional view showing a ceramic compact 32 employed in a seventh embodiment of the present invention, which is provided on one major surface 33 with a first paste film 34 and a second paste film 35 formed thereon.

Referring to FIG. 14, a ceramic compact or green sheet 32 containing a non-reducing ceramic composition is prepared. A first paste film 34 is provided on one major surface 33 of the green sheet 32 and dried; then a second paste film 35 is provided on the same. The first paste film 34 is formed of first paste containing a dopant and vehicle, and the second paste film 35 is formed of second paste containing base metal powder and vehicle.

Figure 15:
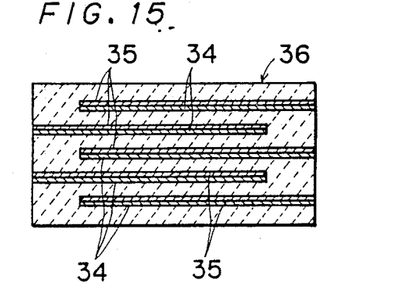
FIG. 15 is a sectional view showing a laminate 36 of the ceramic compacts 32 shown in FIG. 14.

Then, additional such structures as shown in FIG. 14 are stacked alternately in opposite directions to obtain a laminate 36, as shown in FIG. 15.

Figure 16:
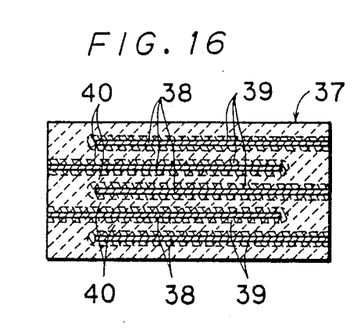
FIG. 16 is a sectional view showing a ceramic body 37 obtained by firing the laminate 36 shown in FIG. 15.

FIG. 16 shows a ceramic body 37 which is obtained by firing the laminate 36 shown in FIG. 15 in a reducing atmosphere. The ceramic body 37 is provided in its interior with a plurality of capacitance extracting electrodes or internal electrodes 38, which are obtained from the second paste films 35. Thereafter, semiconductive layers 39 are formed in the vicinity of the respective internal electrodes 38 by thermal diffusion of the dopant contained in the first paste films 34. It is understood that a dielectric layer 40, provided with semiconductive layers 39 on both sides, is defined in a portion held between each pair of internal electrodes 38.

Figure 17:
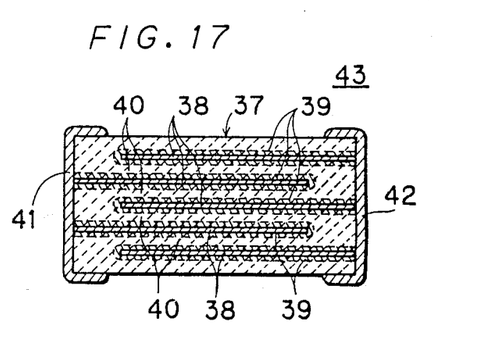
FIG. 17 is a sectional view showing a laminated ceramic capacitor 43 obtained by carrying out the seventh embodiment of the present invention.

As shown in FIG. 17, external electrodes 41 and 42 are formed on both end portions of the ceramic body 37. The respective external electrodes 41 and 42 are electrically connected with corresponding ones of the internal electrodes 38. A desired laminated ceramic capacitor 43 is thus obtained.

In the step of the seventh embodiment shown in FIG. 14, the second paste film 35 may be first provided on the major surface 33 of the green sheet 32 and thereafter the first paste film 34 may be applied on the same, thereby to obtain a substantially similar laminated ceramic capacitor.

Experiment 4, which was carried out on the basis of the seventh embodiment will now be described.

Experiment 4

First, raw materials of non-reducing dielectric ceramic compositions were prepared from those expressed as $\{(Ba_{1-x}Ca_x)O\}_m(Ti_{1-y}Zr_y)O_2$, which were weighted to be in compositions of m, x and y shown in Table 7. The weighted raw materials were mixed and calcined to obtain ceramic powder. 15 percent by weight of a mixed aqueous solution of an organic binder, a dispersing agent and a defoaming agent was added to each ceramic powder, which was mixed and pulverized with 50 percent by weight of water in a ball mill, to prepare a slurry. Using this slurry, green sheets of 30 to 60 μm in thickness were prepared with doctor blade method.

Reducing agents or dopants were kneaded with vehicle of ethyl cellulose resin and a butyl cellosolve solvent in the mixing ratios shown in Table 7, to prepare first paste members. The dopants were prepared by mixing oxide powder materials of $Nb_2O_5$, $Y_2O_3$, $CeO_2$, $La_2O_3$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$ and $Yb_2O_3$ in the ratios shown in Table 7.

Second paste was prepared by kneading base metal powder of Ni metal powder with vehicle of ethyl cellulose resin and a butyl cellosolve solvent.

Each first paste was applied by screen printing to each ceramic green sheet, which was then dried. The second paste was applied by screen printing to the first paste layer formed on the ceramic green sheet and then dried. A plurality of such green sheets coated with the first paste and the second paste were so stacked that the coated regions overlapped each other, and integrated by thermocompression bonding to form a laminate.

A unit was cut from the laminate by a blade. This unit was heated up to 500° C. in the air to burn the organic binder. Thereafter the unit was fired in a reducing atmosphere employing $H_2$-$N_2$-air gas having oxygen partial pressure of $10^{-9}$ to $10^{-12}$ MPa at 1300° C. for two hours, to obtain a ceramic body. Silver paste was then applied to end surfaces of the ceramic body and fired in a neutral atmosphere at 800° C., to form external electrodes. Each sample (chip-type laminated capacitor) was thus obtained.

Specification of each chip-type laminated capacitor prepared in this Experiment is as follows:

Outside Dimensions: 3.2 mm in width, 1.6 mm in length and 1.2 mm in thickness

Ceramic Element Thickness (interelectrode distance): t=20 to 40 $\mu$m

Total Number of Effective Dielectric Layers: N=19 layers

Counter electrode Area per Layer: S=1.32 mm$^2$

Capacitance (C), dielectric loss (tan$\delta$) and insulation resistance (R) of each sample were measured to obtain the product (CR product) of the capacitance and the insulation resistance. The capacitance (C) and the dielectric loss (tan$\delta$) were measured at 1 kHz and 1 V$_{rms}$ by utilizing an automatic bridge. The insulation resistance (R) was measured after applying 50 V for two minutes by utilizing a high insulation tester. Further, apparent dielectric constant ($\epsilon$) was obtained on the basis of the capacitance (C), as follows:

$$\epsilon = C \times t / 8.854 \times 10^{-12} \times S \times N = 4.50 \times 10^{15} \times C \times t$$

An eighth embodiment of the present invention is now described with reference to FIGS. 18 to 21.

Figure 18:
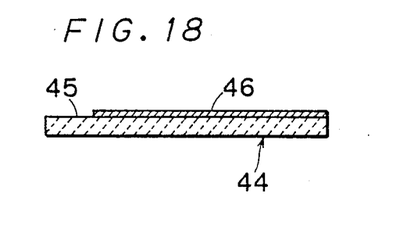
FIG. 18 is a sectional view showing a ceramic compact 44 employed in an eighth embodiment of the present invention, which is provided with a paste film 46 containing a base metal on one major surface 45.

Referring to FIG. 18, a ceramic compact or green sheet 44 containing a non-reducing ceramic composition is prepared. The green sheet 44 is provided on one major surface 45 with a paste film 46 containing base metal powder and vehicle but no reducing agent or dopant.

Figure 19:
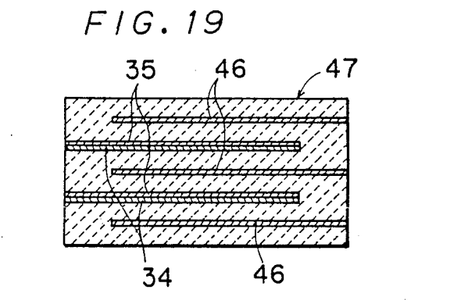
FIG. 19 is a sectional view showing a laminate 47 which is obtained by alternatively stacking the ceramic compacts 32 and 44 shown in FIGS. 14 and 18 respectively.

FIG. 19 shows a laminate 47, which is obtained by alternately stacking the green sheets 44 and 33 shown in FIGS. 18 and 14 respectively.

Figure 20:
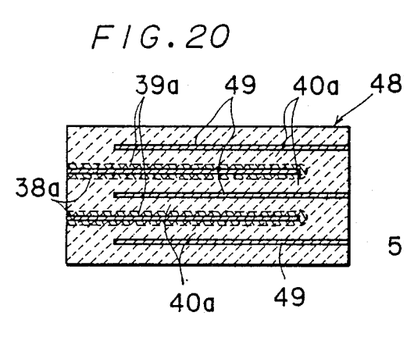
FIG. 20 is a sectional view showing a ceramic body 48 obtained by firing the laminate 47 shown in FIG. 19.

The laminate 47 shown in FIG. 19 is fired in a reducing atmosphere, to obtain a ceramic body 48 as shown in FIG. 20. Alternately positioned in the ceramic body 48 are internal electrodes 49 which are obtained from the paste films 46 and internal electrodes 38$a$ which are obtained from the paste films 35. In the vicinity of the internal electrodes 38$a$, semiconductive layers 39$a$ are defined by the dopant contained in the paste films 34. Thus, it is understood that the semiconductive layer 39$a$ and a dielectric layer 40$a$ are defined in a portion held between each pair of internal electrodes 39$a$ and 49.

Figure 21:
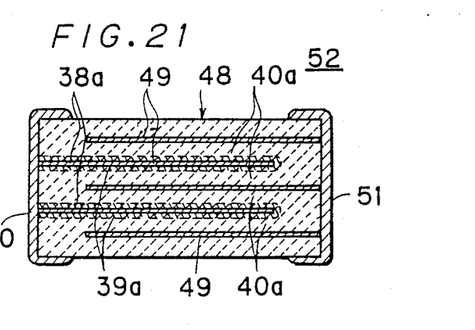
FIG. 21 is a sectional view showing a laminated ceramic capacitor 52 obtained by carrying out the eighth embodiment of the present invention.

Then, external electrodes 50 and 51 are formed on both end portions of the ceramic body 48, as shown in FIG. 21. The external electrode 50 is electrically connected with the internal electrodes 38$a$, while the other external electrodes 51 are electrically connected with the internal electrodes 49. A desired laminated ceramic capacitor 52 is thus obtained.

Experiment 5, which was carried out on the basis of the eighth embodiment will now be described.

TABLE 7

| Sample No. | First Paste Vehicle (wt. %) | First Paste Dopant Type | First Paste Dopant Content (wt. %) | Ceramic Composition $\{(Ba_{1-x}Ca_x)O\}_m(Ti_{1-y}Zr_y)O_2$ m | 1 − x | x | 1 − y | y | Sheet Thickness ($\mu$m) | Capacitance (nF) | Dielectric Loss tan $\delta$ (%) | Apparent Dielectric Constant | CR Product ($\Omega$F) |
|---|---|---|---|---|---|---|---|---|---|---|---|---|---|
| 44* | — | — | — | 1.01 | 0.90 | 0.10 | 0.80 | 0.20 | 50 | 53.2 | 2.3 | 7900 | 2890 |
| 45 | 70 | Nb$_2$O$_5$ | 30 | 1.01 | 0.90 | 0.10 | 0.80 | 0.20 | 50 | 135.9 | 3.0 | 20200 | 2950 |
| 46 | 95 | La$_2$O$_3$ | 5 | 1.01 | 0.90 | 0.10 | 0.80 | 0.20 | 32 | 208.2 | 2.0 | 19800 | 3570 |
| 47 | 80 | CeO$_2$ | 20 | 1.01 | 0.90 | 0.10 | 0.80 | 0.20 | 46 | 153.6 | 2.0 | 21000 | 4960 |
| 48 | 70 | CeO$_2$ | 30 | 1.01 | 0.90 | 0.10 | 0.80 | 0.20 | 60 | 116.1 | 2.1 | 20700 | 4320 |
| 49 | 50 | Nd$_2$O$_3$ | 50 | 1.01 | 0.90 | 0.10 | 0.80 | 0.20 | 46 | 162.4 | 1.8 | 22200 | 3970 |
| 50 | 75 | Pr$_6$O$_{11}$ | 25 | 1.01 | 0.90 | 0.10 | 0.80 | 0.20 | 32 | 193.5 | 2.1 | 18400 | 3250 |
| 51* | — | — | — | 1.01 | 0.80 | 0.20 | 0.90 | 0.10 | 46 | 49.0 | 2.0 | 6700 | 5500 |
| 52 | 80 | Sm$_2$O$_3$ | 20 | 1.01 | 0.80 | 0.20 | 0.90 | 0.10 | 57 | 89.7 | 1.8 | 15200 | 6300 |
| 53 | 90 | Eu$_2$O$_3$ | 10 | 1.01 | 0.80 | 0.20 | 0.90 | 0.10 | 50 | 94.2 | 2.0 | 14000 | 5300 |
| 54 | 75 | Gd$_2$O$_3$ | 25 | 1.01 | 0.80 | 0.20 | 0.90 | 0.10 | 46 | 104.6 | 1.9 | 14300 | 6450 |
| 55 | 90 | Y$_2$O$_3$ | 10 | 1.01 | 0.80 | 0.20 | 0.90 | 0.10 | 32 | 148.2 | 1.9 | 14100 | 5730 |
| 56 | 80 | La$_2$O$_3$ | 20 | 1.01 | 0.80 | 0.20 | 0.90 | 0.10 | 57 | 80.9 | 1.7 | 13700 | 7920 |
| 57 | 60 | CeO$_2$ | 40 | 1.01 | 0.80 | 0.20 | 0.90 | 0.10 | 46 | 113.4 | 1.8 | 15500 | 7100 |
| 58* | — | — | — | 1.01 | 0.90 | 0.10 | 0.85 | 0.15 | 30 | 106.5 | 1.3 | 9500 | 2100 |
| 59 | 70 | Dy$_2$O$_3$ | 30 | 1.01 | 0.90 | 0.10 | 0.85 | 0.15 | 54 | 137.1 | 1.2 | 22000 | 3540 |
| 60 | 60 | Er$_2$O$_3$ | 40 | 1.01 | 0.90 | 0.10 | 0.85 | 0.15 | 30 | 315.1 | 1.5 | 28100 | 4350 |
| 61 | 85 | Tm$_2$O$_3$ | 15 | 1.01 | 0.90 | 0.10 | 0.85 | 0.15 | 32 | 276.5 | 1.3 | 26300 | 4100 |
| 62 | 90 | Yb$_2$O$_3$ | 10 | 1.01 | 0.90 | 0.10 | 0.85 | 0.15 | 54 | 125.9 | 1.1 | 20200 | 3350 |
| 63 | 90 | Tb$_2$O$_3$ | 10 | 1.01 | 0.90 | 0.10 | 0.85 | 0.15 | 30 | 292.7 | 1.3 | 26100 | 2980 |
| 64 | 80 | Ho$_2$O$_3$ | 20 | 1.01 | 0.90 | 0.10 | 0.85 | 0.15 | 43 | 176.1 | 1.1 | 22500 | 2200 |

*reference sample

As obvious from Table 7, apparent dielectric constants of the samples according to the present invention, i.e., the samples of Nos. 45 to 50, 52 to 57 and 59 to 64 were at least twice those of the reference samples of Nos. 44, 51 and 58, which were obtained by stacking only the green sheets coated with the paste containing no dopants. Further, it has been confirmed that the CR products of the samples according to the present invention exceeded 2000 $\Omega$F, to be applicable to practical use.

Experiment 5

Experiment 5 was carried out under conditions substantially identical to those of Experiment 4. Table 8 shows details of prepared samples and electrical properties thereof.

With reference to Experiment 5, the green sheet 18 shown in FIG. 18 is identical in composition to the green sheet 32 shown in FIG. 14. Further, the paste film 46 is identical in composition to the second paste film 35 shown in FIG. 14.

Figure 24:
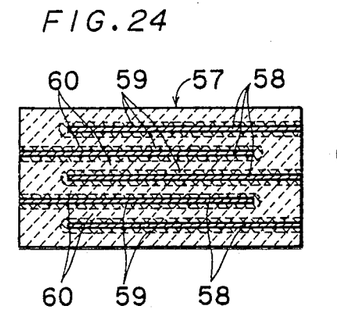
FIG. 24 is a sectional view showing a ceramic body 57 obtained by firing the laminate 56 shown in FIG. 23.

FIG. 24 shows a ceramic body 57, which is obtained by firing the laminate 56 in a reducing atmosphere. A

TABLE 8

| Sample No. | Paste Containing Dopant | | | Ceramic Composition $\{(Ba_{1-x}Ca_x)O\}_m(Ti_{1-y}Zr_y)O_2$ | | | | | Sheet Thickness ($\mu$m) | Electrical Property | | | CR Product ($\Omega$F) |
|---|---|---|---|---|---|---|---|---|---|---|---|---|---|
| | Ni Content (wt. %) | Dopant Type | Dopant Content (wt. %) | m | 1 − x | x | 1 − y | y | | Capacitance C(nF) | Dielectric Loss tan δ (%) | Apparent Dielectric Constant | |
| 65* | 100 | — | 0 | 1.01 | 0.90 | 0.10 | 0.80 | 0.20 | 50 | 53.2 | 2.3 | 7900 | 2890 |
| 66 | 96 | $Nb_2O_5$ | 4 | 1.01 | 0.90 | 0.10 | 0.80 | 0.20 | 32 | 191.4 | 2.4 | 18200 | 2720 |
| 67 | 90 | $Nb_2O_5$ | 10 | 1.01 | 0.90 | 0.10 | 0.80 | 0.20 | 50 | 135.3 | 3.0 | 20100 | 2810 |
| 68 | 90 | $CeO_2$ | 10 | 1.01 | 0.90 | 0.10 | 0.80 | 0.20 | 60 | 90.8 | 2.0 | 16200 | 5520 |
| 69 | 90 | $Pr_6O_{11}$ | 10 | 1.01 | 0.90 | 0.10 | 0.80 | 0.20 | 46 | 160.2 | 1.8 | 21900 | 4370 |
| 70 | 80 | $Nd_2O_3$ | 20 | 1.01 | 0.90 | 0.10 | 0.80 | 0.20 | 32 | 196.6 | 1.9 | 18700 | 3120 |
| 71 | 70 | $La_2O_3$ | 30 | 1.01 | 0.90 | 0.10 | 0.80 | 0.20 | 60 | 97.0 | 1.7 | 17300 | 5210 |
| 72* | 100 | — | 0 | 1.01 | 0.80 | 0.20 | 0.90 | 0.10 | 46 | 49.0 | 2.0 | 6700 | 5500 |
| 73 | 80 | $CeO_2$ | 20 | 1.01 | 0.80 | 0.20 | 0.90 | 0.10 | 50 | 109.0 | 1.8 | 16200 | 7300 |
| 74 | 85 | $Sm_2O_3$ | 15 | 1.01 | 0.80 | 0.20 | 0.90 | 0.10 | 57 | 82.0 | 1.8 | 13900 | 6500 |
| 75 | 70 | $Eu_2O_3$ | 30 | 1.01 | 0.80 | 0.20 | 0.90 | 0.10 | 46 | 123.6 | 1.9 | 16900 | 5700 |
| 76 | 75 | $Gd_2O_3$ | 25 | 1.01 | 0.80 | 0.20 | 0.90 | 0.10 | 32 | 180.8 | 1.6 | 17200 | 7100 |
| 77 | 95 | $La_2O_3$ | 5 | 1.01 | 0.80 | 0.20 | 0.90 | 0.10 | 46 | 100.9 | 1.7 | 13800 | 6200 |
| 78 | 90 | $Y_2O_3$ | 10 | 1.01 | 0.80 | 0.20 | 0.90 | 0.10 | 57 | 79.7 | 1.7 | 13500 | 6950 |
| 79* | 100 | — | 0 | 1.01 | 0.90 | 0.10 | 0.85 | 0.15 | 30 | 106.5 | 1.3 | 9500 | 2100 |
| 80 | 80 | $Dy_2O_3$ | 20 | 1.01 | 0.90 | 0.10 | 0.85 | 0.15 | 54 | 125.9 | 1.1 | 20200 | 4500 |
| 81 | 75 | $Er_2O_3$ | 25 | 1.01 | 0.90 | 0.10 | 0.85 | 0.15 | 43 | 180.7 | 1.2 | 23100 | 3030 |
| 82 | 80 | $Tm_2O_3$ | 20 | 1.01 | 0.90 | 0.10 | 0.85 | 0.15 | 32 | 267.1 | 1.3 | 25400 | 3150 |
| 83 | 80 | $Yb_2O_3$ | 20 | 1.01 | 0.90 | 0.10 | 0.85 | 0.15 | 54 | 124.0 | 1.2 | 19900 | 4020 |
| 84 | 80 | $Tb_2O_3$ | 20 | 1.01 | 0.90 | 0.10 | 0.85 | 0.15 | 43 | 176.1 | 1.2 | 22500 | 3570 |
| 85 | 90 | $Ho_2O_3$ | 10 | 1.01 | 0.90 | 0.10 | 0.85 | 0.15 | 30 | 220.9 | 1.3 | 19700 | 2340 |
| 86 | 80 | $La_2O_3$ | 20 | 1.01 | 0.90 | 0.10 | 0.85 | 0.15 | 32 | 274.4 | 0.9 | 26100 | 5040 |

*reference sample

As obvious from Table 8, apparent dielectric constants of the samples according to the present invention, i.e., the samples of Nos. 66 to 71, 73 to 78 and 80 to 86 were at least twice those of the reference samples of Nos. 65, 72 and 79, which were obtained by stacking only green sheets coated with paste members containing no dopants. It has been also confirmed that CR products of the samples according to the present invention exceeded 2000 $\Omega$F, to be applicable to practical use.

A ninth embodiment of the present invention is now described with reference to FIGS. 22 to 25.

Figure 22:
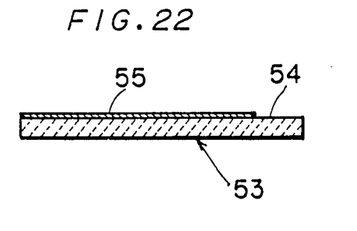
FIG. 22 is a sectional view showing a ceramic compact 53 employed in a ninth embodiment of the present invention, which is provided with a paste film 55 containing a reducing agent or dopant and a base metal on one major surface 54.

Referring to FIG. 22, a ceramic compact or green sheet 53 containing a non-reducing ceramic composition is prepared. A paste film 55 is provided on one major surface 54 of the green sheet 53. The paste film 55 is formed of paste containing base metal powder, reducing agent or dopant powder and vehicle.

Figure 23:
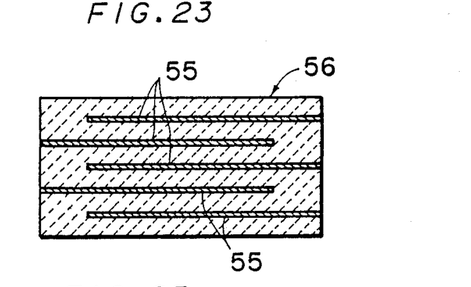
FIG. 23 is a sectional view showing a laminate 56 obtained by stacking the ceramic compacts 53 shown in FIG. 22.

Such structures shown in FIG. 22 are stacked alternately in opposite directions, thereby to obtain a laminate 56 shown in FIG. 23.

plurality of internal electrodes 58 are provided within the ceramic body 57. These internal electrodes 58 are obtained from the paste films 55. Semiconductor layers 59 are formed in the vicinity of the internal electrodes 58 by the dopant contained in the paste films 55. Thus, a dielectric layer 60, which is provided with the semiconductive layers 59 on both sides, is defined in a portion held between each pair of internal electrodes 58.

Figure 25:
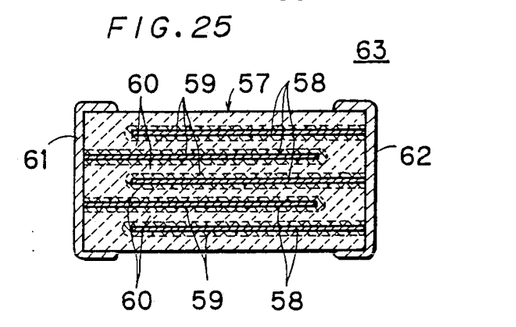
FIG. 25 is a sectional view showing a laminated ceramic capacitor 63 obtained by carrying out the ninth embodiment of the present invention.

Then, external electrodes 61 and 62 are formed on both end portions of the ceramic body 57, as shown in FIG. 25. A desired laminated ceramic capacitor 63 is thus obtained.

Experiment 6, which was carried out on the basis of the ninth embodiment will now be described.

Experiment 6

Experiment 6 was carried out substantially in the similar manner to Experiment 4. Table 9 shows details of prepared samples and electrical properties thereof.

TABLE 9

| Sample No. | Paste | | | Ceramic Composition $\{(Ba_{1-x}Ca_x)O\}_m(Ti_{1-y}Zr_y)O_2$ | | | | | Sheet Thickness ($\mu$m) | Electrical Property | | | CR Product ($\Omega$F) |
|---|---|---|---|---|---|---|---|---|---|---|---|---|---|
| | Ni Content (wt. %) | Dopant Type | Dopant Content (wt. %) | m | 1 − x | x | 1 − y | y | | Capacitance C(nF) | Dielectric Loss tan δ (%) | Apparent Dielectric Constant | |
| 87* | 100 | — | 0 | 1.01 | 0.90 | 0.10 | 0.80 | 0.20 | 50 | 53.2 | 2.3 | 7900 | 2890 |
| 88 | 98 | $Nb_2O_5$ | 2 | " | " | " | " | " | 45 | 147.3 | 2.5 | 19700 | 2500 |
| 89 | 95 | $Nb_2O_5$ | 5 | " | " | " | " | " | 60 | 118.9 | 3.4 | 21200 | 2710 |
| 90 | 95 | $CeO_2$ | 5 | " | " | " | " | " | 32 | 194.5 | 1.8 | 18500 | 4920 |
| 91 | 80 | $Pr_6O_{11}$ | 20 | " | " | " | " | " | 45 | 202.6 | 2.0 | 27100 | 2910 |
| 92 | 90 | $Nd_2O_3$ | 10 | " | " | " | " | " | 60 | 102.1 | 1.9 | 18200 | 2850 |
| 93 | 70 | $La_2O_3$ | 30 | " | " | " | " | " | 50 | 140.6 | 1.8 | 20900 | 3510 |
| 94* | 100 | — | 0 | 1.01 | 0.80 | 0.20 | 0.90 | 0.10 | 46 | 49.0 | 2.0 | 6700 | 5500 |
| 95 | 90 | $CeO_2$ | 10 | " | " | " | " | " | 46 | 133.1 | 1.7 | 18200 | 5200 |
| 96 | 90 | $SmO_2$ | 10 | " | " | " | " | " | 32 | 161.9 | 1.8 | 15400 | 6200 |
| 97 | 85 | $EuO_3$ | 15 | " | " | " | " | " | 50 | 113.0 | 1.5 | 16800 | 5010 |
| 98 | 95 | $Gd_2O_3$ | 5 | " | " | " | " | " | 32 | 146.1 | 1.8 | 13900 | 5980 |
| 99 | 80 | $La_2O_3$ | 20 | " | " | " | " | " | 50 | 100.9 | 1.6 | 15000 | 7150 |

TABLE 9-continued

| Sample No. | Paste Ni Content (wt. %) | Dopant Type | Dopant Content (wt. %) | Ceramic Composition {(Ba$_{1-x}$Ca$_x$)O}$_m$(Ti$_{1-y}$Zr$_y$)O$_2$ m | 1 − x | x | 1 − y | y | Sheet Thickness (μm) | Capacitance C(nF) | Dielectric Loss tan δ (%) | Apparent Dielectric Constant | CR Product (ΩF) |
|---|---|---|---|---|---|---|---|---|---|---|---|---|---|
| 100 | 95 | Y$_2$O$_3$ | 5 | " | " | " | " | " | 46 | 100.2 | 1.6 | 13700 | 6170 |
| 101* | 100 | — | 0 | 1.01 | 0.90 | 0.10 | 0.85 | 0.15 | 30 | 106.5 | 1.3 | 9500 | 2100 |
| 102 | 90 | Dy$_2$O$_3$ | 10 | " | " | " | " | " | 43 | 157.3 | 1.3 | 20100 | 3240 |
| 103 | 70 | Ey$_2$O$_3$ | 30 | " | " | " | " | " | 32 | 264.9 | 1.4 | 25200 | 2120 |
| 104 | 90 | Tm$_2$O$_3$ | 10 | " | " | " | " | " | 54 | 119.0 | 1.2 | 19100 | 3590 |
| 105 | 90 | Yb$_2$O$_3$ | 10 | " | " | " | " | " | 30 | 299.4 | 1.3 | 26700 | 3010 |
| 106 | 90 | Tb$_2$O$_3$ | 10 | " | " | " | " | " | 32 | 273.4 | 1.1 | 26000 | 2990 |
| 107 | 85 | Ho$_2$O$_3$ | 15 | " | " | " | " | " | 43 | 152.6 | 0.9 | 19500 | 2050 |
| 108 | 95 | La$_2$O$_3$ | 5 | " | " | " | " | " | 43 | 171.4 | 0.9 | 21900 | 5930 |

*reference sample

As obvious from Table 9, apparent dielectric constants of the samples according to the present invention were at least twice those of the samples of Nos. 87, 94 and 101, which were coated with Ni powder paste containing no dopants. It has been confirmed that products of capacitance and insulation resistance (CR products) of the samples according to the present invention exceeded 2000 ΩF, to be applicable to practical use.

Although nine embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A ceramic capacitor comprising:
   a ceramic body obtained by firing, in a reducing atmosphere, a ceramic composition which is not made semiconductive upon firing in a reducing atmosphere; and
   at least a pair of capacitance extracting electrodes which are opposite to each other and enclose at least a part of said ceramic body therebetween, said electrodes containing a base metal,
   said part of said ceramic body held between said pair of capacitance extracting electrodes including a dielectric layer and also including a semiconductive portion which is in contact with at least one surface of said dielectric layer and at least one of said pair of capacitance extracting electrodes,
   said semiconductive portion being obtained by diffusing a reducing agent in a stage at which said ceramic body is fired.

2. A ceramic capacitor in accordance with claim 1, wherein said ceramic body is in the form of a plate having first and second major surfaces which are opposite to each other, said capacitance extracting electrodes being formed on said first and second major surfaces respectively.

3. A ceramic capacitor in accordance with claim 2, wherein said semiconductive portion comprises first and second semiconductive layers provided in the vicinity of said first and second major surfaces respectively, whereby said dielectric layer is enclosed by said first and second semiconductive layers.

4. A ceramic capacitor in accordance with claim 2, wherein said semiconductive portion provides said first major surface and said dielectric layer provides said second major surface.

5. A ceramic capacitor in accordance with claim 1, wherein said capacitance extracting electrodes are provided in layers within said ceramic body.

6. A ceramic capacitor in accordance with claim 5, wherein said semiconductive portion is provided along and in proximity to each said capacitance extracting electrode.

7. A ceramic capacitor in accordance with claim 5, wherein said semiconductive portion is provided along and in proximity to every other said capacitance extracting electrode.

8. A method of manufacturing a ceramic capacitor, comprising the steps of:
   preparing an unfired ceramic compact containing a ceramic composition which is not made semiconductive upon firing in a reducing atmosphere;
   preparing a first paste containing a reducing agent and a vehicle;
   applying said first paste to said ceramic compact;
   obtaining a ceramic body by firing said compact coated with said paste in a reducing atmosphere, said ceramic body being provided with a semiconductive portion which is made semiconductive by said reducing agent contained in said paste; and
   forming at least a pair of capacitance extracting electrodes which are opposite to each other and enclosing at least a part of said ceramic body therebetween, at least one of said capacitance extracting electrodes being in contact with said semiconductive portion.

9. A method of manufacturing a ceramic capacitor in accordance with claim 8, wherein said first paste further contains base metal powder having a melting point higher than a firing temperature provided in said step of obtaining said ceramic body, at least one of said capacitance extracting electrodes being formed by firing said paste with said ceramic compact in said step of firing said ceramic compact.

10. A method of manufacturing a ceramic capacitor in accordance with claim 9, wherein a plurality of said ceramic compacts fired in said step of obtaining said ceramic body are stacked to at least partially overlap said capacitance extracting electrodes thereof with each other, said method further comprising a step of forming a pair of external electrodes on the outer surfaces of said ceramic body and electrically connected with corresponding ones of said capacitance extracting electrodes.

11. A method of manufacturing a ceramic capacitor in accordance with claim 8, further including a step of preparing a second paste containing a base metal powder having a melting point higher than a fairing temperature applied in said step of obtaining said ceramic body, and containing a vehicle, said base metal being selected so as to form said capacitance extracting electrodes, and wherein said step of applying said first paste comprises a step of applying said first paste to the surface of said ceramic compact, overlapped with said second paste.

12. A method of manufacturing a ceramic capacitor in accordance with claim 11, wherein said first paste is applied to be in contact with the surface of said ceramic compact step of applying said first paste in said overlapped with said second paste.

13. A method of manufacturing a ceramic capacitor in accordance with claim 11, wherein a plurality of said ceramic compacts fired in said step of obtaining said ceramic body are stacked to at least partially overlap said capacitance extracting electrodes thereof with each other, said method further comprising a step of forming a pair of outer electrodes on the outer surfaces of said ceramic body electrically connected with corresponding ones of said capacitance extracting electrodes.

14. A method of manufacturing a ceramic capacitor in accordance with claim 8, wherein said step of forming said capacitance extracting electrodes is carried out after said step of obtaining said ceramic body.

15. A method of manufacturing a ceramic capacitor in accordance with claim 14, wherein said step of forming said capacitance extracting electrodes includes a step of forming said electrodes by a method selected from a metal paste baking method and a metal thin film forming method.

* * * * *